United States Patent Office 3,480,462
Patented Nov. 25, 1969

3,480,462
HOT MELT COATING PROCESS
Jesse P. Shanok, Brooklyn, and Victor Shanok, New York, N.Y., assignors to Glass Laboratories Company, Brooklyn, N.Y., a partnership of Jesse P. Shanok and Victor Shanok
No Drawing. Filed Oct. 21, 1965, Ser. No. 500,184
Int. Cl. B44d 1/38
U.S. Cl. 117—47
9 Claims

ABSTRACT OF THE DISCLOSURE

In a hot melt coating process the adhesion of the coating to the base is increased by wetting the base with the thin layer of a liquid which is a swelling agent for the polymer and then bringing the base wet with liquid into contact with the bath of molten polymer.

---

This invention relates to the bonding of a polymeric material to a base, and relates more particularly to the application of a layer of polymeric material to a metal foil base.

One aspect of this invention relates to the discovery that in a hot-melt coating process, the adhesion of a polymeric material such as cellulose acetate butyrate to a base such as aluminum foil can be increased by providing the base with a very thin coating of a liquid which thoroughly wets the foil and which is in turn wet by the molten polymeric material.

In one highly convenient embodiment of the invention the liquid is deposited onto the base in thicker layer than is needed, than part of this layer is evaporated off until only a very thin layer of the liquid remains, and then the base carrying the very thin layer is brought into contact with the molten polymer. It is found that if the evaporation is continued until all the liquid is driven off from the base before molten polymer is applied, the adhesion is poor. If, on the other hand, the molten material is applied before evaporation has proceeded sufficiently to reduce the thickness of the layer to the desired extent, a less desirable product is obtained in that the polymer is bubbly.

The liquid can be applied in substantially undiluted condition to the base and then partially evaporated. Alternatively, a mixture of the liquid and a more volatile diluent can be applied followed by evaporation of the diluent.

The process is particularly useful in continuous steady-state coating operations, in which a web of the base material is continuously forwarded to a hot-melt coating zone. Here the moving web approaching the coating zone can first pass through a zone where a layer of the liquid is applied and then through an evaporative zone in which a substantial part of that layer is removed. No measurement of the thickness of the applied liquid layer or of the amount of evaporation is needed. It is sufficient for the operator merely to pre-set the conditions in the evaporative zone (e.g. by regulating the temperatures of any heaters used in that zone or by altering the distance between such heaters and the moving web) after simple preliminary tests. Thus, in these preliminary tests, if the product leaving the hot-melt coating zone has a bubbly polymeric layer the amount of evaporation should be increased, while if the adhesion is not high (indicating substantially complete removal of the liquid layer before it comes in contact with the melt) the amount of evaporation should be decreased. After making these simple tests and the appropriate corrections in the conditions in the evaporative zone, the operator can permit the apparatus to run continuously, under substantially steady state conditions, without further adjustments. It has been found that the thickness of the liquid layer on the base entering the hot melt is not narrowly critical; that is, after just sufficient liquid has been removed to eliminate bubbling, there is still enough liquid on the base to provide a reasonable working range before the improved adhesion is lost by carrying the evaporation too far. The practical working range is wider when the wetting liquid is not highly volatile.

In one preferred embodiment, the liquid applied to the base is a low viscosity polar organic liquid having a low molecular weight, e.g. a molecular weight below about 500, advantageously below about 200. The material may, for example, be an ester, alcohol, or ketone, e.g. ethylene diacetate, B-chlorethanol, ethylene dichloride (an ester of glycol and hydrochloric acid), vinyl acetate, vinyl butyrate, chloroacetone or ethyl acrylate and having a boiling point below 200° C. The liquid is advantageously one which is a solvent or swelling agent for the polymeric material to be applied to the base. While polymerizable monomers may be employed the conditions, in this embodiment of the invention, are advantageously such that no substantial polymerization or other chemical reaction of the monomer occurs prior to the contact of the base with the hot melt. Preferably, the liquid employed is colorless and stable to heat, at the temperature of the hot melt, and stable and non-discoloring under ultra-violet light. It should wet the base material readily. The thickness of the layer of liquid on the base is advantageously below about $\frac{1}{2000}$ inch (e.g. .0001 inch) but this layer may be substantially monomolecular or only a few molecules thick.

It is found that ordinary aluminum foil, such as annealed rolled foil, may be used in the process of this invention without the need for any preliminary degreasing or other processing.

The following examples are given to illustrate this invention further.

EXAMPLE 1

A strip of annealed rolled aluminum foil (carrying, as is conventional, sufficient rolling lubricant to permit it to unwind freely from the roll on which it was mounted) was unwound continuously and passed directly, while maintaining the foil in its flat condition and without changing its direction, successively through a liquid-applying station, a heating zone, a bath of molten cellulose acetate butyrate free of volatile solvent (Tenite Butyrate, M flow) and a sizing die, at the rate of 90 feet per minute and then cooled to room temperature. At the liquid-applying station, a film of ethylene diacetate about 0.001 inch in thickness was applied to both sides of the moving foil at room temperature. In the heating zone the strip of foil was passed between electric radiant heaters which evaporated off the major part of the applied liquid. The bath of molten cellulose acetate butyrate was maintained at a temperature of 350° F.; the strip took about ½ second to travel through the bath. The sizing die was such as to leave a layer of the cellulose acetate butyrate 0.02 inch thick on each side of the strip, the latter being completely embedded in the clear cellulose acetate butyrate. The resulting product had a metallic appearance, the shiny surface of the aluminum being visible through the clear plastic. The product could be bent 180° on itself without developing crinkles in the embedded aluminum foil, showing that the aluminum adhered to the plastic material.

EXAMPLE 2

Example 1 was repeated, substituting chloroethanol for the ethylene diacetate, with similar results.

While this invention has been illustrated using an aluminum foil base, with which it has found its greatest utility, it may be employed with other base materials. Particularly suitable are other metallic bases, especially foils, e.g. tin, stainless steel, copper, brass, or zinc, or other smooth-surfaced bases such as glass. The use of other polymeric materials besides cellulose acetate butyrate for the hot melt coating is also within the broader scope of this invention; thus there may be employed such other cellulose esters as cellulose acetate or cellulose propionate; polyvinyl resins such as polyvinyl acetate, polyethyl acrylate, polystyrene, polyethylene or polypropylene; or other high polymers, for example, condensation polymers such as polycaprolactam or other nylons (e.g. nylon 66) or polyesters such as polyethylene terephthalate.

The liquid may be applied in any convenient manner. Thus, it may be padded onto the base, as by passing the base between pads wet with the liquid, or it may be applied by metering rolls (e.g. knurled rolls dipping into baths of the liquid), or it may be doctored onto the base in known manner, etc. The partial removal of the liquid may be promoted by subjecting the base carrying the liquid film to subatmospheric pressure (as in a vacuum chamber) to increase the evaporation of the liquid.

What is claimed is:

1. Process of coating a base material with a hot melt coating of a polymer by bringing the base material into contact with a bath of said polymer in molten condition, which comprises applying to the base material, prior to its contact with said bath, a thin layer of a liquid which wets the base material and is a swelling agent for said polymer, and then bringing said base wet with said liquid into contact with said bath of molten polymer.

2. Process as set forth in claim 1 in which the base material is a metal foil.

3. Process as set forth in claim 1 in which the liquid has a molecular weight below about 500.

4. Process as set forth in claim 1 in which the liquid is an ester.

5. Process as set forth in claim 4 in which the liquid is an ester having a molecular weight below about 200 and a boiling point below 200° C.

6. Process as set forth in claim 1 in which said liquid swelling agent is a solvent for said polymer.

7. Process as set forth in claim 1 and comprising continuously passing an aluminum foil from a supply thereof to said bath and, as said foil passes continuously from said supply to said bath, continuously depositing on the moving uncoated foil a thin layer of a low viscosity liquid, and continuously evaporating a portion of said liquid prior to the entry of said foil into said bath.

8. Process as set forth in claim 7 in which said polymer is cellulose acetate butyrate and said liquid is chloroethanol.

9. Process as set forth in claim 7 in which said polymer is cellulose acetate butyrate and said liquid is ethylene diacetate.

References Cited

UNITED STATES PATENTS 3,015,576  1/1962  Hendrixson et. al. ____ 117—49

OTHER REFERENCES

Condensed Chemical Dictionary, 6th Ed., N.Y., Reinhold Publ. Corp., 1961 pp. 464–467, 841 and 842.

ALFRED L. LEAVITT, Primary Examiner

J. A. BELL, Assistant Examiner

U.S. Cl. X.R.

117—49, 72, 75, 113, 115, 132